United States Patent
Cho et al.

(10) Patent No.: US 10,720,628 B2
(45) Date of Patent: Jul. 21, 2020

(54) BATTERY MODULE INCLUDING COOLING PIN HAVING FIXING PROTRUSIONS FORMED THEREON

(71) Applicant: LG CHEM, LTD., Seoul (KR)

(72) Inventors: Young Suk Cho, Daejeon (KR); Dae Sik Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 35 days.

(21) Appl. No.: 15/715,767

(22) Filed: Sep. 26, 2017

(65) Prior Publication Data

US 2018/0090736 A1 Mar. 29, 2018

(30) Foreign Application Priority Data

Sep. 29, 2016 (KR) .......... 10-2016-0125244

(51) Int. Cl.
| | | |
|---|---|---|
| *H01M 10/6555* | (2014.01) | |
| *H01M 2/02* | (2006.01) | |
| *H01M 2/10* | (2006.01) | |
| *H01M 10/647* | (2014.01) | |
| *H01M 10/6556* | (2014.01) | |

(Continued)

(52) U.S. Cl.
CPC .......... *H01M 2/24* (2013.01); *H01M 2/0275* (2013.01); *H01M 2/1016* (2013.01); *H01M 2/1094* (2013.01); *H01M 10/613* (2015.04); *H01M 10/647* (2015.04); *H01M 10/656* (2015.04); *H01M 10/6555* (2015.04); *H01M 10/6556* (2015.04)

(58) Field of Classification Search
CPC . H01M 2/02–0295; H01M 2/10–1094; H01M 10/60–627; H01M 10/64–659
See application file for complete search history.

(56) References Cited

U.S. PATENT DOCUMENTS 5,346,786 A * 9/1994 Hodgetts ............. H01M 2/1016
429/121
8,592,069 B1 * 11/2013 Anderson ........... H01M 2/1083
429/100

(Continued)

FOREIGN PATENT DOCUMENTS

| KR | 2005-0123482 A | 12/2005 |
|---|---|---|
| KR | 10-0669468 B1 | 1/2007 |
| KR | 2013-0001993 U | 3/2013 |

OTHER PUBLICATIONS

Korean Office Action dated Feb. 14, 2020, issued in counterpart Korean Patent application No. 10-2016-0125244.

*Primary Examiner* — Jonathan G Leong
*Assistant Examiner* — Jacob Buchanan
(74) *Attorney, Agent, or Firm* — Morgan, Lewis & Bockius LLP

(57) ABSTRACT

Provided is a battery module including a battery cell laminate and a cooling pin. The battery cell laminate includes a plurality of battery cells are arranged adjacent to each other, each of the battery cells having a structure in which an electrode assembly is sealed together with an electrolytic solution, within a battery case. The cooling pin is interposed between the battery cells, the cooling pin having a plate-shaped structure and including a plurality of fixing protrusions that are locally inserted into an outer surface of the battery case of the battery cell that faces the cooling pin and fixed in position with respect to the battery cell.

12 Claims, 3 Drawing Sheets

(51) Int. Cl.
*H01M 10/613* (2014.01)
*H01M 10/656* (2014.01)
*H01M 2/24* (2006.01)

(56) References Cited

U.S. PATENT DOCUMENTS

| | | | | |
|---|---|---|---|---|
| 2002/0157242 | A1* | 10/2002 | Fukuda | B29C 47/062 |
| | | | | 29/730 |
| 2005/0287426 | A1* | 12/2005 | Kim | B60L 11/1874 |
| | | | | 429/149 |
| 2007/0122695 | A1* | 5/2007 | Kim | H01M 2/1016 |
| | | | | 429/152 |
| 2013/0115506 | A1* | 5/2013 | Wayne | H01M 10/647 |
| | | | | 429/120 |
| 2016/0149255 | A1* | 5/2016 | Ganton | H01M 2/0202 |

* cited by examiner

BATTERY MODULE INCLUDING COOLING PIN HAVING FIXING PROTRUSIONS FORMED THEREON

CROSS-REFERENCE TO RELATED APPLICATION

This application claims priority to Korean Patent Application No. 10-2016-0125244 filed on Sep. 29, 2016 and all the benefits accruing therefrom under 35 U.S.C. § 119, the contents of which are incorporated by reference in their entirety.

BACKGROUND

The present disclosure relates to a battery module including a cooling pin having fixing protrusions formed thereon.

Recently, as technical development and demands for mobile devices have increased, demands for rechargeable secondary batteries as energy sources are rapidly increasing, and thus more researches on the secondary batteries are being carried out to cope with such diverse demands. Also, the secondary batteries have attracted considerable attention as power sources for an electric vehicle (EV), a hybrid electric vehicle (HEV), and a plug-in hybrid electric vehicle (Plug-In HEV), which have been proposed as solutions to air pollution and the like caused by existing gasoline and diesel vehicles that use fossil fuels.

Therefore, the electric vehicle (EV) capable of traveling using only a battery and the hybrid electric vehicle (HEV) using a battery in combination with an existing engine, have been developed, some of which have been commercialized. For the secondary batteries as power sources for EVs and HEVs, nickel metal hydride (Ni-MH) batteries are commonly used. However, recent researches on using lithium secondary batteries having high energy density, high discharge voltage, and output stability are being actively carried out, some of which have reached commercialization.

When such secondary batteries are used in a device or an apparatus such as a vehicle power source and an electric power storage device, which require high capacity, the secondary batteries are used in the form of a battery cell assembly or a battery module in which a plurality of battery cells are arranged.

Generally, such a battery cell assembly or battery module includes constituents for cooling the battery cells, in order to maintain the stability of the battery by effectively removing a large amount of heat generated from the battery cells during the charging and discharging processes.

FIG. 1 is a schematic vertical cross-sectional view partially illustrating a structure of a related art battery module.

Referring to FIG. 1, a battery module 10 includes battery cells 11 and cooling pins 12.

The battery cells 11 are arranged in a state in which side surfaces thereof are adjacent to each other, and the cooling pins 12 are interposed between the battery cells 11.

A large amount of heat generated from the battery cells 11 are transferred to the cooling pins 12 interposed between the battery cells 11 and then dissipated.

However, when the battery module 10 having the above-described structure is used as a power source in a device such as an automobile that is frequently exposed to external impact and vibration, a coupling force between the battery cells 11 and the cooling pins 12 may be loosened due to the impact and vibration, and thus some battery cells 13 are separated from the battery module 10, thereby resulting in electrical disconnection.

Thus, there is a great need for technologies that can fundamentally solve the above-described limitations.

SUMMARY

The present disclosure provides solutions for the above-described limitations according to the related art and technical limitations requested from the past.

Particularly, the present disclosure provides a battery module that is mounted, as a power source, on a device such as an automobile that is frequently exposed to external impact and vibration, wherein the battery module includes a cooling pin for discharging heat generated from a battery cell and preventing a coupling force between the battery cell and the cooling pin from being loosened due to the external impact and the vibration. Therefore, the battery module may prevent electrical disconnection caused by separation of some battery cells from the battery module, thus ensuring safety.

In accordance with an exemplary embodiment, a battery module includes: a battery cell laminate in which a plurality of battery cells are arranged adjacent to each other, each of the battery cells having a structure in which an electrode assembly is sealed together with an electrolytic solution, within a battery case; and a cooling pin interposed between the battery cells and having a plate-shaped structure, the cooling pin including a plurality of fixing protrusions that are disposed on an outer surface of the cooling pin and fixed in position with respect to the battery cell by being locally inserted into an outer surface of a battery case of a battery cell facing the cooling pin.

Thus, the battery module in accordance with the exemplary embodiment includes the plurality of fixing protrusions that are disposed on an outer surface of the cooling pin and fixed in position with respect to the battery cell by being locally inserted into the outer surface of the battery case of the battery cell facing the cooling pin. Therefore, the battery module may prevent a coupling force between the battery cell and the cooling pin from being loosened due to external impact and vibration, and thus may prevent electrical disconnection caused by separation of some battery cells from the battery module thus ensuring safety.

In one exemplary embodiment, the battery case may be configured from a laminate sheet including a resin outer layer with excellent durability, a metal layer with barrier properties, and a resin sealant layer with thermofusible properties, and the resin sealant layer may be thermally fused mutually.

Since the resin outer layer should have excellent resistance against external environment, the resin outer layer needs to have predetermined tensile strength and weatherability. To this end, a polyethylene terephthalate (PET) and an elongated nylon film may be used as a polymer resin of the resin outer layer.

The metal layer with barrier properties may be preferably made of aluminum in order to exert not only the function of improving the strength of the battery case but also the function of preventing introduction or leakage of foreign substances such as gas and moisture.

The resin sealant layer may be preferably made of a polyolefin-based resin, which has a thermofusible (heat-bondable) property, a low hygroscopic property to suppress permeation of an electrolytic solution, and prevents expansion or corrosion caused by the electrolytic solution. More preferably, the resin sealant layer may be made of non-elongated polypropylene (CPP).

In one exemplary embodiment, the fixing protrusion of the cooling pin may have a structure in which the fixing protrusion is inserted into the resin outer layer of the battery case. That is, the cooling pin may be made of a metallic material, and when the fixing protrusion is inserted even into the metal layer, the cooling pin may be electrically connected to the metal layer of the battery case to cause a short-circuit in the battery cell.

Thus, the insertion depth of the fixing protrusion may be smaller than the thickness of the resin outer layer of the battery case, in order to prevent the short-circuit from occurring in the battery cell.

Particularly, the insertion depth of the fixing protrusion with respect to the resin outer layer may range from 20% to 90% of the thickness of the resin outer layer.

When the insertion depth of the fixing protrusion is smaller than 20% of the thickness of the resin outer layer, a coupling force of the fixing protrusion with respect to the resin outer layer may be not fully secured. On the other hand, when the insertion depth of the fixing protrusion is greater than 90% of the thickness of the resin outer layer, the fixing protrusion may penetrate the resin outer layer and then contact the metal layer to cause the short-circuit, due to external impact and vibration.

More particularly, the insertion depth of the fixing protrusion with respect to the resin outer layer may be 20 μm to 35 μm.

In one exemplary embodiment, each of the fixing protrusions may have a wedge structure with a pyramidal or conical shape, but may not be limited to its shape as long as the fixing protrusion is locally inserted into the battery case to allow a sufficient coupling force between the cooling pin and the battery cell to be provided.

In one exemplary embodiment, each of the fixing protrusions may have a triangular shape when viewed from a vertical cross-section, but may not be limited to its shape as long as the fixing protrusion is locally inserted into the battery case to allow a sufficient coupling force between the cooling pin and the battery cell to be provided.

In another exemplary embodiment, each of the fixing protrusions may have an arrowhead or a harpoon shape when viewed from a vertical cross-section. The fixing protrusion with such a shape may be easily inserted into the outer surface of the battery case, but it may be difficult to separate the fixing protrusion from the battery case in reverse order. As a result, a higher coupling force may be provided between the cooling pin and the battery cell.

In one exemplary embodiment, the fixing protrusions may be arranged to be equidistantly spaced apart from each other, and an imaginary line connecting the fixing protrusions located at the outermost positions has a shape that is same as or similar to that of an outer periphery of the cooling pin.

As described above, since the fixing protrusions are equidistantly arranged and have a shape similar to that of the outer periphery of the cooling pin, the coupling forces between the cooling pin and the battery cell may be equally distributed. This can thus prevent the coupling forces at specific regions between the cooling pin and the battery cell from being weakened and also prevent the cooling pin and the battery cell from being separated even in case of external impact and vibration.

In another exemplary embodiment, the fixing protrusions may be arranged to be equidistantly spaced apart from each other, and an imaginary line connecting the fixing protrusions located at the outermost positions has a shape that is same as or similar to that of an outer periphery of the battery cell.

As described above, since the fixing protrusions are equidistantly arranged and have a shape similar to that of the outer periphery of the battery cell, the coupling forces between the cooling pin and the battery cell may be equally distributed. This can thus prevent the coupling forces at specific regions between the cooling pin and the battery cell from being weakened and also prevent the cooling pin and the battery cell from being separated even in case of external impact and vibration.

In one exemplary embodiment, the plane size of the cooling pin may be 90% to 120% of the plane size of the battery cell.

When the plane size of the cooling pin is smaller than 90% of the plane size of the battery cell, a large amount of heat generated from the battery cell may not be sufficiently cooled. On the other hand, when the plane size of the cooling pin is greater than 120% of the plane size of the battery cell, a battery module may not have a compact structure because the cooling pin protrudes excessively from the battery cell.

In one exemplary embodiment, the cooling pin may be made of a metallic material, a thermal conductive polymer resin or a resin composite, but may not be limited thereto as long as the cooling pin may transfer a large amount of heat from the battery cell.

In one exemplary embodiment, the cooling pin may have a one-side end portion that is vertically bent in a state of protruding outwardly from one surface of the battery cell laminate and thus form a bent portion that comes into contact with the one surface of the battery cell laminate. The bent portion may be considered as a passage through which the heat transferred from the battery cell to the cooling pin is dissipated.

Also, the cooling pin may have an inner surface or an outer surface to which a heat sink is attached. The heat generated from the battery cell may be transferred to the heat sink via the bent portion of the cooling pin and may be cooled in the heat sink.

Particularly, the heat sink may have a structure that includes a refrigerant passage through which a refrigerant flows in a liquid or gaseous state.

Although a type of the battery cell is not particularly limited, a specific example of the batter cell may include a lithium secondary battery such as a lithium ion battery and a lithium ion polymer battery having high energy density, high discharge voltage, and output stability.

Generally, the lithium secondary battery includes a positive electrode, a negative electrode, a separator, and a non-aqueous electrolytic solution containing a lithium salt.

The positive electrode is manufactured, for example, by applying a mixture of a positive electrode active material, a conductive material, and a binder onto a positive electrode collector and then drying, and if necessary, a filler may be further added to the mixture.

Examples of the positive electrode active material may include: a layered compound such as a lithium cobalt oxide ($LiCoO_2$), a lithium nickel oxide ($LiNiO_2$), and 3-component-based lithium nickel manganese oxide ($LiNi_{(x)}Mn_{(y)}Co_{(1-y)}O_2$ (where x=0.01~0.99, y=0.01~0.99, 0<x+y<1), or a compound substituted with one or more transition metals; a lithium manganese oxide such as $Li_{1+x}Mn_{2-x}O_4$ (where, x=0~0.33), $LiMnO_3$, $LiMn_2O_3$, and $LiMnO_2$; a lithium copper oxide ($Li_2CuO_2$); a vanadium oxide such as $LiV_3O_8$, $LiFe_3O_4$, $V_2O_5$, and $Cu_2V_2O_7$; a Ni-site type lithium nickel oxide expressed by a chemical formula $LiNi_{1-x}M_xO_2$ (where M=Co, Mn, Al, Cu, Fe, Mg, B, or Ga, and x=0.01~0.3); a lithium manganese composite oxide expressed by a chemical formula $LiMn_{2-x}M_xO_2$ (where M=Co, Ni, Fe, Cr, Zn, or Ta, and x=0.01~0.1) or a chemical formula $Li_2Mn_3MO_8$ (M=Fe, Co, Ni, Cu, or Zn); $LiMn_2O_4$ where a portion of the Li of the chemical formula is substituted with alkaline earth metal ions; a disulfide compound; and $Fe_2(MoO_4)_3$, but are not limited thereto.

Generally, the conductive material is added in an amount of 1 to 30 wt % with respect to the total weight of the mixture including the positive active material. The conductive material is not particularly limited as long as the conductive material has electrical conductivity without causing a chemical change in the corresponding battery. For example, the conductive material may include: graphite such as natural graphite and artificial graphite; carbon black such as carbon black, acetylene black, Ketj en black, channel black, furnace black, lamp black, and thermal black; a conductive fiber such as a carbon fiber and a metal fiber; metal powder such as fluorocarbon, aluminum, and nickel powder; a conductive whisker such as a zinc oxide and potassium titanate; a conductive metal oxide such as a titanium oxide; and a conductive material such as a polyphenylene derivative.

The binder is a substance that assists in binding of the active material and the conductive material and binding to the collector, and generally added in an amount of 1 to 30 wt % with respect to the total weight of the mixture including the positive electrode active material. For example, the binder may include: polyfluorovinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, stylene butylene rubber, fluoro rubber, and various copolymers.

The filler is selectively used as a substance for suppressing expansion of the positive electrode, and is not particularly limited as long as the filler is a fibrous material without causing a chemical change in the corresponding battery. For example, the filler includes: an olefin-based copolymer such as polyethylene and polypropylene; and a fibrous material such as a glass fiber and a carbon fiber.

The negative electrode is manufactured by applying a negative electrode active material onto a negative electrode collector and then drying, and if necessary, substances described above may be further selectively included.

For example, the negative electrode active material may include: carbon such as non-graphitized carbon and graphitized carbon; a metal composite oxide such as $Li_xFe_2O_3$ ($0 \le x \le 1$), $Li_xWO_2 (0 \le x \le 1)$ and $Sn_xMe_{1-x}Me'yOz$ (Me: Mn, Fe, Pb, Ge; Me': Al, B, P, Si, Group I, II and III elements of the Periodic Table, halogen atoms; $0 < x \le 1$; $1 \le y \le 3$; and $1 \le z \le 8$); a lithium metal; a lithium alloy; a silicon-based alloys; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; and a Li—Co—Ni based material.

The separator and a separating film are interposed between the positive electrode and the negative electrode, and an insulating thin film having high ion permeability and mechanical strength is used as the separator and the separating film. The separator typically has a pore diameter of 0.01 to 10 μm and a thickness of 5 to 130 μm. For example, the separator includes: an olefin-based polymer such as polypropylene that has chemical resistance and hydrophobicity; and a sheet or a non-woven fabric made of a glass fiber and polyethylene. When a solid electrolyte such as a polymer is used as the electrolyte, the solid electrolyte may serve as the separator.

In addition, as a specific example, the separator and/or the separating film may be an organic/inorganic composite porous safety-reinforcing separator (SRS) in order to improve the safety of the battery.

The SRS separator is manufactured by using inorganic particles and a binder polymer, as active layer substances, on a polyolefin-based separator base material. In this case, the SRS separator has not only a porous structure included in the separator base material itself but also a uniform porous structure provided by means of empty spaces (interstitial volumes) between the inorganic particles that are active layer substances.

In case of using the organic/inorganic composite porous separator, it is possible to suppress an increase in the thickness of the battery due to swelling during a formation process, when compared to using a general separator. In addition, in case of using a polymer, which is gellable when impregnated in a liquid electrolytic solution, as a binder polymer substance, the separator may also be used as an electrolyte at the same time.

Also, since the organic/inorganic composite porous separator is able to exhibit excellent adhesion properties by adjusting contents between the binder polymer and the inorganic particles that are substances of the active layer substances within the separator, an assembling process may be easily performed.

The inorganic particles are not specially limited as long as the inorganic particles are electrochemically stable. That is, the inorganic particles that may be used in the present disclosure are not specially limited as long as an oxidation and/or a reduction reaction are/is not generated in a range of an operating voltage (for example, 0-5 V with respect to Li/Li+) of the applied battery. Particularly, in case of using inorganic particles having an ability to transfer ions, a performance may be enhanced by increasing ionic conductivity within an electric chemical device. Therefore, it may be preferable that the ionic conductivity is as high as possible. Also, when the inorganic particles have a high density, it is difficult to disperse the inorganic particles during a coating process, and a weight increases when a battery is manufactured. Therefore, it may be preferable that the density is as low as possible. Also, in case that the inorganic matter has high permittivity, the ionic conductivity of the electrolytic solution may be enhanced by contributing to increase a dissociation rate of an electrolyte salt such as a lithium salt in the liquid electrolyte.

The non-aqueous electrolytic solution containing the lithium salt includes a polar organic electrolytic solution and the lithium salt. As the electrolytic solution, a non-aqueous liquid electrolytic solution, an organic solid electrolyte, and an inorganic solid electrolyte may be used.

For example, the non-aqueous electrolytic solution may include an aprotic organic solvent such as N-methyl-2-pyrrolidone, propylene carbonate, ethylene carbonate, butylene carbonate, dimethyl carbonate, diethyle carbonate, gamma-butyrolactone, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric acid tri-ester, trimethoxy methane, a dioxolane derivative, sulfolan, methyl sulfolan, 1,3-dimethyl-2-imidazolidinone, a propylene carbonate derivative, a tetrahydrofuran derivative, ether, methyl propionate, and ethyl propionate.

For example, the organic solid electrolyte may include a copolymer including a polyethylene derivative, a polyethylene oxide derivative, a polypropylene oxide derivative, a phosphoric acid ester polymer, poly agitation lysine, polyester sulfide, polyvinyl alcohol, poly vinylidene fluoride, or an ionic dissociable group.

For example, the inorganic solid electrolyte may include a nitride, a halide, and a sulfate of the lithium, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$-$Li_2S$—$SiS_2$.

For example, the lithium salt may include a material easily dissolved in the non-aqueous electrolyte, such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lithium lower aliphatic carbonate, lithium 4-phenyl borate, imide, and the like.

Also, for example, the non-aqueous electrolytic solution may include pyridine, triethyl phosphite, triethanolamine, cyclic ether, ethylenediamine, n-glyme, hexaphosphoric triamide, a nitrobenzene derivative, sulfur, a quinone-imine dye, N-substituted oxazolidinone, N,N-substituted imidazolidine, ethylene glycol dialkyl ether, an ammonium salt, pyrrole, 2-methoxyethanol, and aluminum trichloride, which are added to the non-aqueous electrolyte in order to improve discharge and charge characteristics and flame retardancy. In some cases, a halogen-containing solvent such as carbon tetrachloride and ethylene trifluoride may be further included so as to provide non-combustibility, and a carbon dioxide gas may be further included so as to improve high-temperature storage characteristics.

In accordance with another exemplary embodiment, a device including one or more of the battery modules described above is provided.

The device may be a device selected from a mobile phone, a wearable electronic device, a portable computer, a smart pad, a netbook, a light electronic vehicle (LEV), an electric vehicle, a hybrid electric vehicle, a plug-in hybrid electric vehicle, and a power storage device.

Since a structure and a manufacturing method are well known in the art, a detail description thereof will be omitted in this disclosure.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, although the present disclosure is further described with reference to the drawings in accordance with exemplary embodiments, the scope of the present disclosure is not limited thereto.

Figure 1:
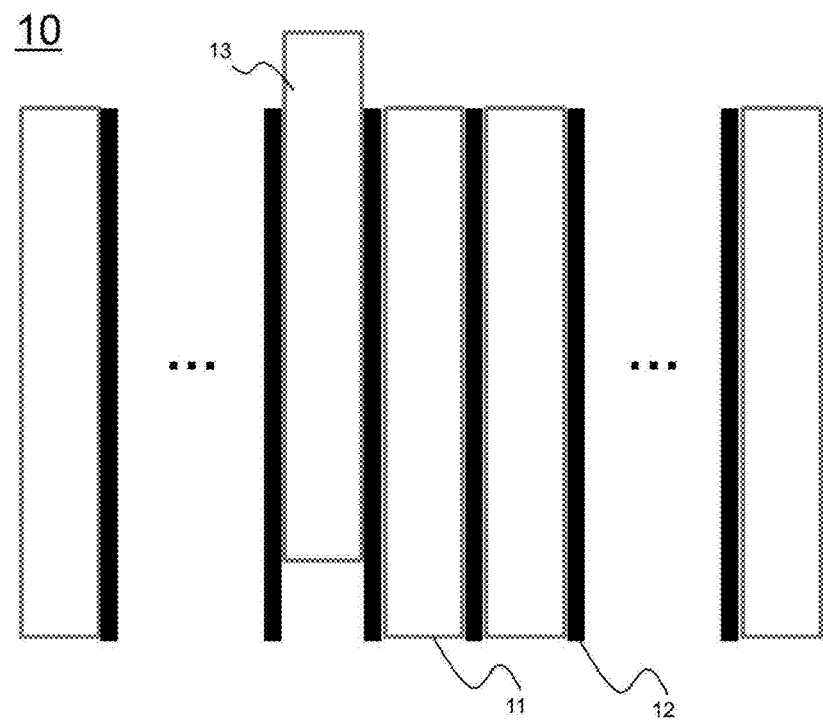
FIG. 1 is a vertical cross-sectional view partially illustrating a structure of a related art battery module.
Figure 2:
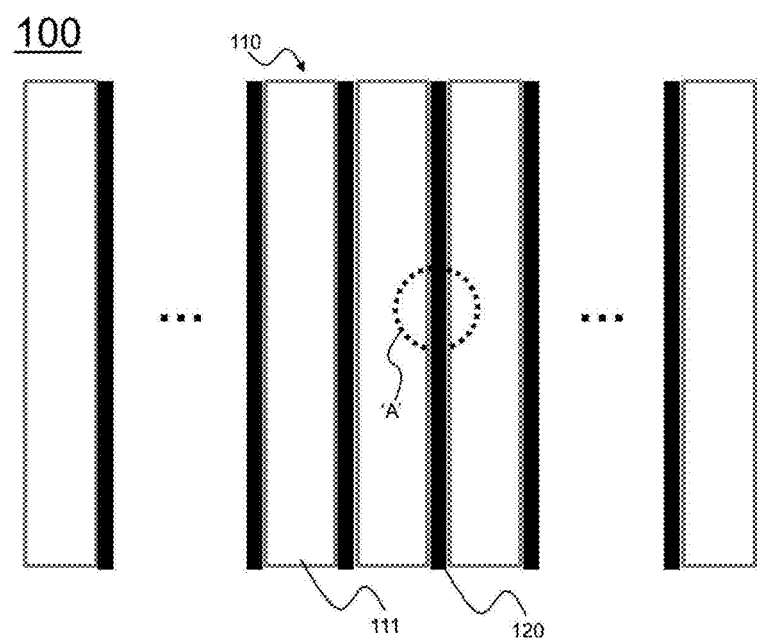
FIG. 2 is a vertical cross-sectional view illustrating a structure of a battery module in accordance with an exemplary embodiment.
Figure 3:
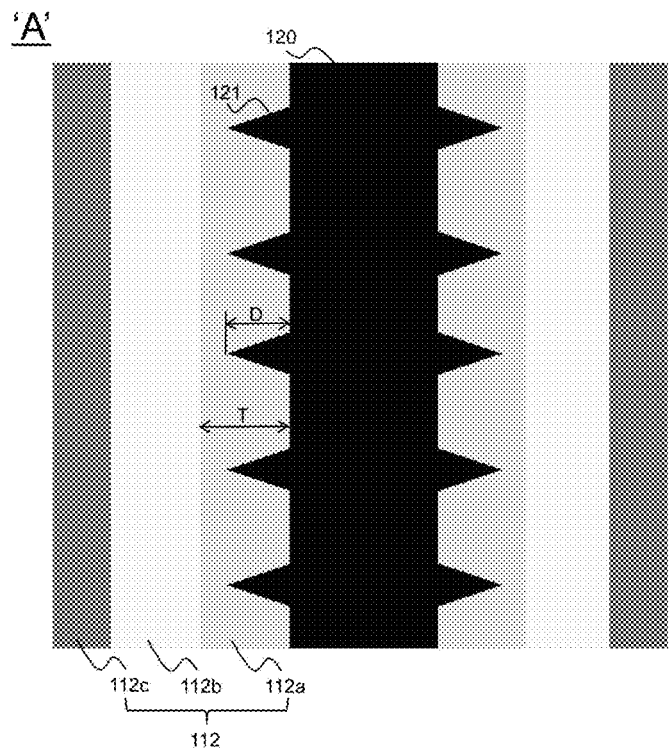
FIG. 3 is an enlarged view of region 'A' of FIG. 2.

FIG. 2 is a schematic vertical cross-sectional view illustrating a structure of a battery module in accordance with one exemplary embodiment, and FIG. 3 is a schematically enlarged view of region 'A' of FIG. 2.

Referring to FIGS. 2 and 3, a battery module 100 includes a battery cell laminate 110 and a cooling pin 120.

The battery cell laminate 110 includes a plurality of pouch-type battery cells 111 arranged in a state in which side surfaces thereof are adjacent to each other.

The cooling pins 120 are interposed between the battery cells 111.

The cooling pins 120 has a plate-shaped structure and includes a plurality of fixing protrusions 121 that are fixed in position with respect to the battery cell 111 by being locally inserted into a resin outer layer 112a of a battery case 112 of the battery cell 111.

The battery case 112 is configured from a laminate sheet including the resin outer layer 112a, a metal layer 112b with barrier properties, and a resin sealant layer 112c with thermofusible properties.

The insertion depth (D) of the fixing protrusion 121 with respect to the resin outer layer 112a is 50% of the thickness (T) of the resin outer layer 112a.

Each of the fixing protrusions 121 has a wedge structure with a conical shape, and has a triangular shape when viewed from a vertical cross-section.

Figure 4:
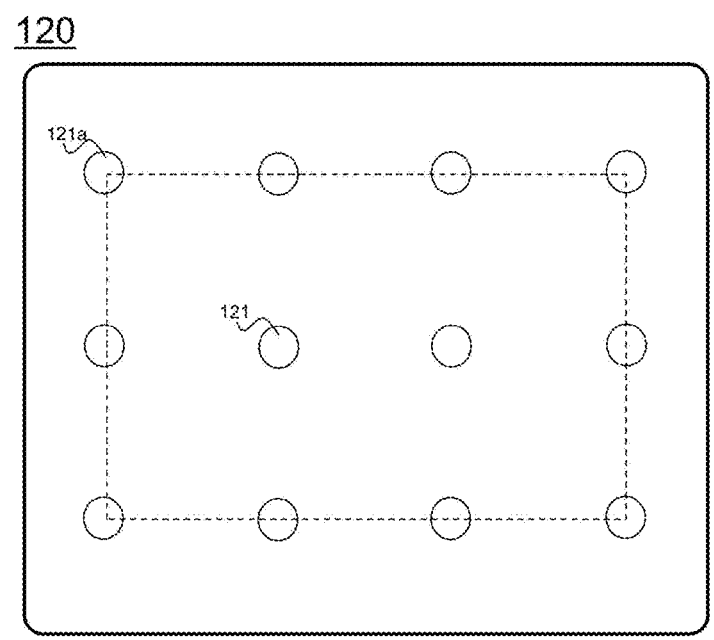
FIG. 4 is a horizontal plan view of a cooling pin of FIG. 2.

In FIG. 4, a horizontal plan view of the cooling pin of FIG. 2 is schematically illustrated.

Referring to FIG. 4 in conjunction with FIG. 2, the fixing protrusions 121 are arranged to be equidistantly spaced apart from each other, and an imaginary line connecting the fixing protrusions 121a located at the outermost positions has a shape similar to that of an outer periphery of the cooling pin 120. Therefore, coupling forces between the cooling pin and the battery cell may be equally distributed. This can thus prevent the coupling forces at specific regions between the cooling pin and the battery cell from being weakened and also prevent the cooling pin and the battery cell from being separated even in case of external impact and vibration.

Also, the plane size of the cooling pin 120 is 100% of the plane size of the battery cell 111.

Figure 5:
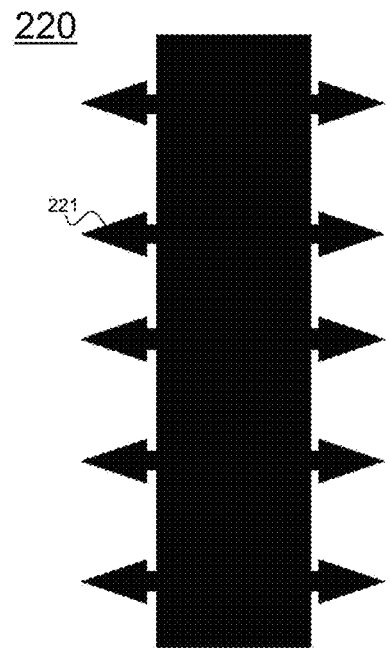
FIG. 5 is a vertical cross-sectional view of a cooling pin of a battery module in accordance with another exemplary embodiment.

In FIG. 5, a vertical cross-sectional view of a cooling pin of a battery module in accordance with another exemplary embodiment is schematically illustrated.

Referring to FIG. 5, each of fixing protrusions 221 of a cooling pin 220 has an arrowhead shape when viewed from a vertical cross-section. Accordingly, the fixing protrusion may be easily inserted into an outer surface of a battery case, but it is difficult to separate the fixing protrusion from the battery case in reverse order. As a result, a higher coupling force may be provided between the cooling pin and the battery cell.

Since other structures except for the shape of the fixing protrusion are equal to those in the exemplary embodiment described in FIG. 2, detail description therefor will not be provided herein.

Figure 6:
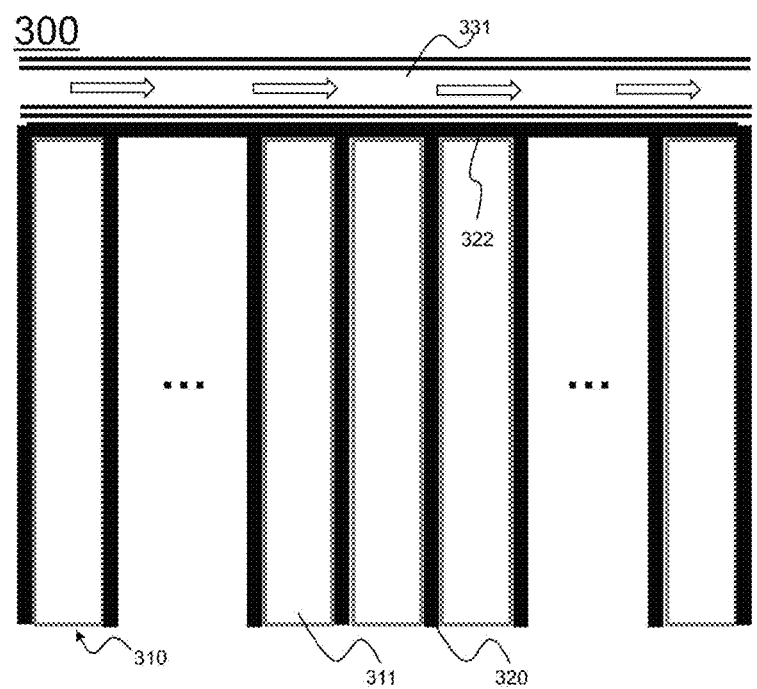
FIG. 6 is a vertical cross-sectional view illustrating a structure of a battery module in accordance with still another exemplary embodiment.

In FIG. 6, a vertical cross-sectional view of a battery module in accordance with still another exemplary embodiment is schematically illustrated.

Referring to FIG. 6, an upper end portion of a cooling pin 320 is vertically bent in a state of protruding outwardly from the top surface of a battery cell laminate 310 and thus forms a bent portion 322 that comes into contact with the top surface of the battery cell laminate 310.

The bent portion 322 of the cooling pin 320 has an outer surface to which a heat sink 300 is attached, and the heat sink 300 has a structure that includes a refrigerant passage 331 through which a refrigerant flows. Accordingly, heat generated from a battery cell 311 may be transferred to the heat sink via the bent portion of the cooling pin and may be cooled in the heat sink.

Since other structures, except for the bent portion of the cooling pin and the heat sink, are equal to those in the exemplary embodiment described in FIG. 2, detail description therefor will not be provided herein.

As described above, a battery module in accordance with the exemplary embodiments includes a plurality of fixing protrusions that are disposed on the outer surface of a cooling pin and fixed in position with respect to a battery cell by being locally inserted into the outer surface of a battery case of the battery cell facing the cooling pin. Therefore, the battery module may prevent the coupling force between the battery cell and the cooling pin from being loosened due to the external impact and vibration, and thus may prevent the electrical disconnection caused by separation of some battery cells from the battery module to thereby ensure safety.

It will be apparent by those skilled in the art that various applications and modifications can be made thereto, on the basis of the above-descriptions, within the scope of the present disclosure.

What is claimed is:

1. A battery module comprising:
   a plurality of battery cells arranged adjacent to each other, each of the battery cells having a structure in which an electrode assembly is sealed together with an electrolytic solution, within a battery case; and
   a cooling member, interposed between the plurality of battery cells, including a plate-shaped main body and a plurality of fixing protrusions each having a pointed distal end projecting from an outer surface of the main body, the cooling member being fixed in position with respect to an adjacent one of the battery cells of the plurality of battery cells by the fixing protrusions being inserted into an outer surface of a battery case of the adjacent one of the battery cells facing the cooling member such that the outer surface of the main body directly contacts the outer surface of the battery case,
   wherein the battery case is configured from a laminate sheet comprising a resin outer layer, a metal layer with barrier properties, and a resin sealant layer with thermofusible properties,
   wherein each of the fixing protrusions has a shaft with an end having an arrowhead or a harpoon shape when viewed from a vertical cross-section, and
   wherein the fixing protrusions of the cooling member are inserted into the resin outer layer of the battery case with an insertion depth less than a thickness of the resin outer layer of the battery case so that the fixing protrusions are separated from the metal layer to prevent a short-circuit.

2. The battery module of claim 1, wherein the insertion depth of the fixing protrusions with respect to the resin outer layer ranges from 20% to 90% of the thickness of the resin outer layer.

3. The battery module of claim 1, wherein the insertion depth of the fixing protrusions with respect to the resin outer layer is 20 µm to 35 µm.

4. The battery module of claim 1, wherein the fixing protrusions are arranged to be equidistantly spaced apart from each other, and an imaginary line connecting the fixing protrusions located at the outermost positions has a shape that is same as or similar to that of an outer periphery of the cooling member.

5. The battery module of claim 1, wherein the fixing protrusions are arranged to be equidistantly spaced apart from each other, and an imaginary line connecting the fixing protrusions located at the outermost positions has a shape that is same as or similar to that of an outer periphery of an adjacent one of the plurality of battery cells.

6. The battery module of claim 1, wherein the plane size of the cooling member is 90% to 120% of the plane size of an adjacent one of the plurality of battery cells.

7. The battery module of claim 1, wherein the cooling member includes a metallic material, a thermal conductive polymer resin or a resin composite.

8. The battery module of claim 1, wherein the cooling member has a one-side end portion that is vertically bent in a state of protruding outwardly from one surface of the battery cell laminate and forms a bent portion that comes into contact with the one surface of the battery cell laminate.

9. The battery module of claim 8, wherein the cooling member has an inner surface or an outer surface to which a heat sink is attached.

10. The battery module of claim 9, wherein the heat sink has a structure that comprises a refrigerant passage through which a refrigerant flows in a liquid or gaseous state.

11. The battery module of claim 1, wherein an entirety of each of the fixing protrusions is entirely inserted into the outer surface of the battery case of the adjacent one of the batter cells of the plurality of battery cells.

12. A device comprising one or more of the battery modules of claim 1.

* * * * *